US008421581B2

(12) United States Patent
Baima

(10) Patent No.: US 8,421,581 B2
(45) Date of Patent: *Apr. 16, 2013

(54) PUSH-BUTTON TESTING SYSTEM

(75) Inventor: Adrian Baima, Woodland Hills, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 12/981,306

(22) Filed: Dec. 29, 2010

(65) Prior Publication Data

US 2011/0089952 A1 Apr. 21, 2011

Related U.S. Application Data

(60) Continuation of application No. 12/946,510, filed on Nov. 15, 2010, now Pat. No. 8,130,073, which is a division of application No. 11/685,705, filed on Mar. 13, 2007, now Pat. No. 7,852,193.

(51) Int. Cl.
*G01L 1/22* (2006.01)

(52) U.S. Cl.
USPC .................................................. 338/2; 338/13

(58) Field of Classification Search ................ 338/2, 47, 338/13
See application file for complete search history.

(56) References Cited

U.S. PATENT DOCUMENTS

| | | | | | |
|---|---|---|---|---|---|
| 3,664,203 | A * | 5/1972 | Pataki | | 74/55 |
| 4,633,721 | A * | 1/1987 | Nishiyama | | 73/862.628 |
| 5,182,517 | A | 1/1993 | Thelen et al. | | |
| 5,388,467 | A | 2/1995 | Jereb et al. | | |
| 5,434,566 | A | 7/1995 | Iwasa et al. | | |
| 6,369,689 | B1 * | 4/2002 | Osmer et al. | | 338/2 |
| 6,512,445 | B1 * | 1/2003 | Schafert et al. | | 338/2 |
| 7,852,193 | B2 * | 12/2010 | Baima | | 338/47 |

* cited by examiner

*Primary Examiner* — Kyung Lee
(74) *Attorney, Agent, or Firm* — Brooks Kushman P.C.

(57) ABSTRACT

A system for testing a push-button switch is provided. The system for testing a push-button switch includes a switch test device. The switch test device has a flexible tab attached to a pushing member at an end of the flexible tab. A sensor is attached to the flexible tab. The sensor generates a signal that changes relative to a deformation of the flexible tab. A data collection system is connected to the switch test device and receives signals from the sensor.

19 Claims, 5 Drawing Sheets

FIG. 3
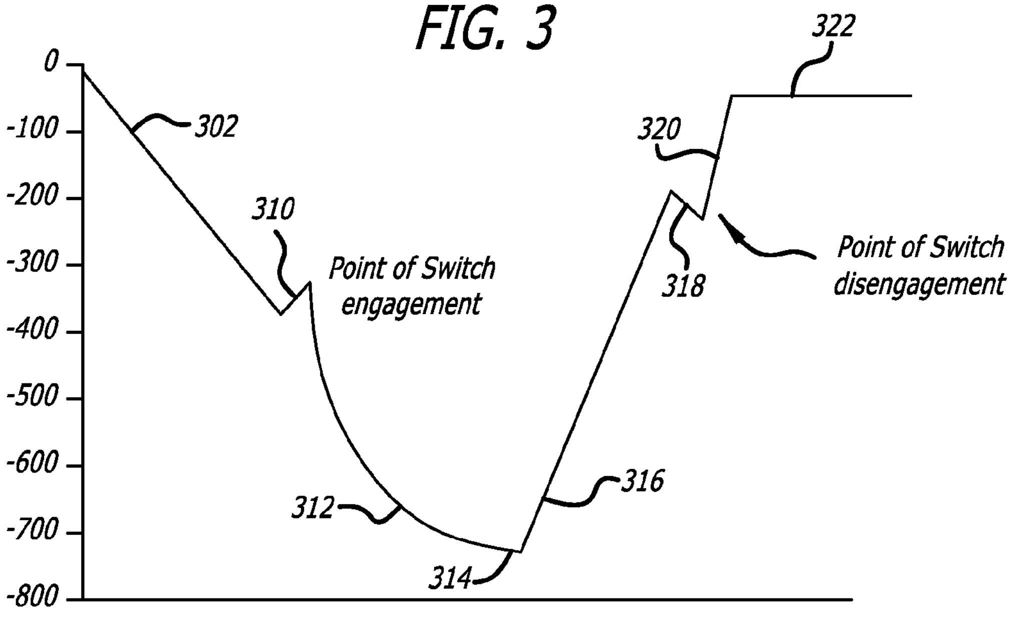
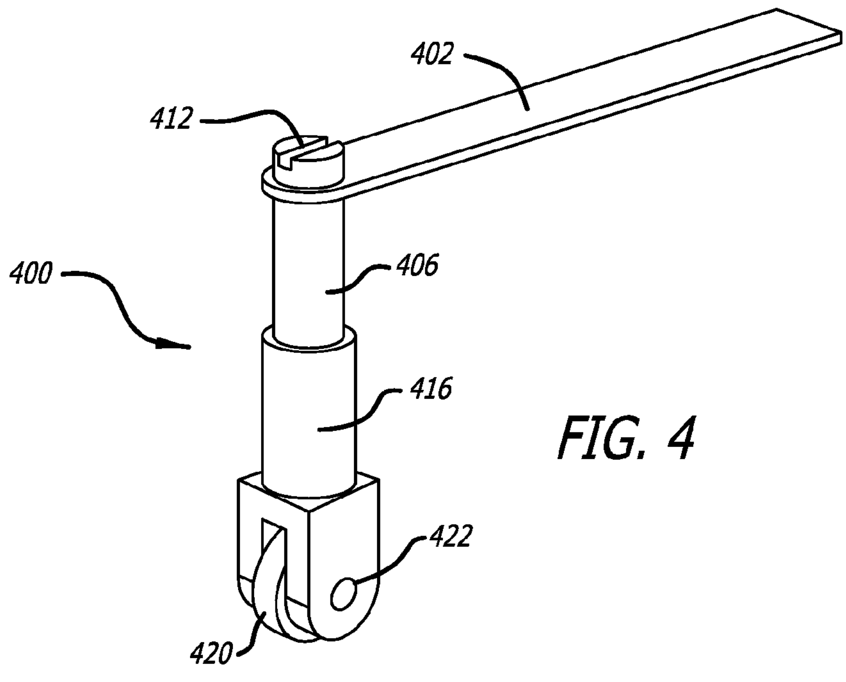
FIG. 4

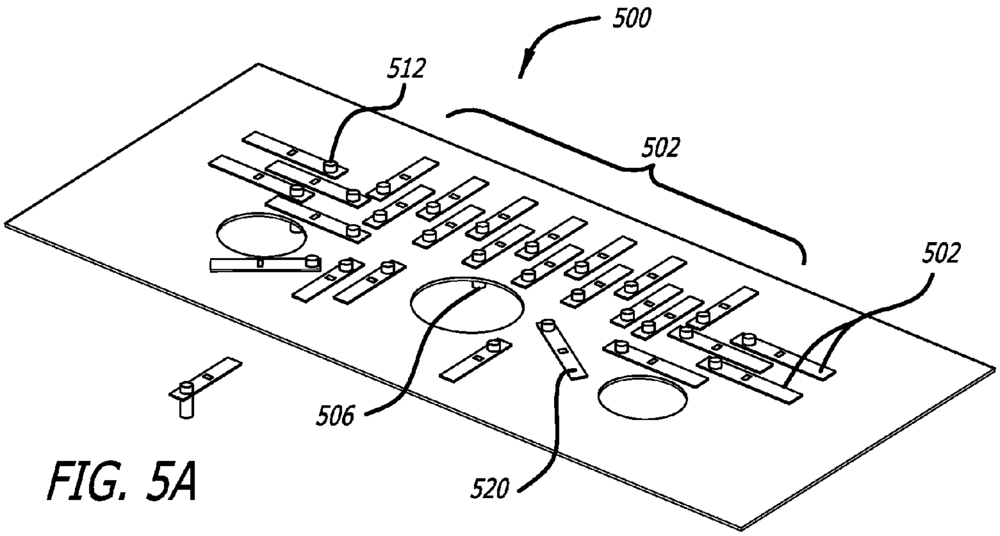
FIG. 5A
FIG. 5B
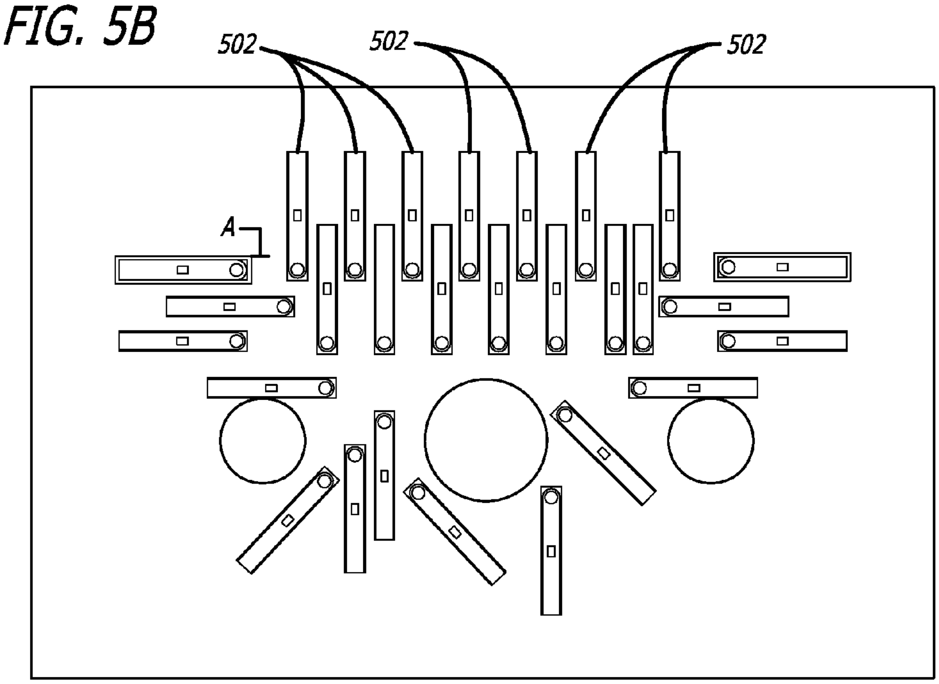

PUSH-BUTTON TESTING SYSTEM

CROSS-REFERENCE TO RELATED APPLICATIONS

This application is a continuation of U.S. application Ser. No. 12/946,510 filed on Nov. 15, 2010, titled PUSH-BUTTON TESTING SYSTEM, (now U.S. Pat. No. 8,130,073), which claims priority to U.S. application Ser. No. 11/685,705 filed on Mar. 13, 2007, titled PUSH-BUTTON TESTING SYSTEM (now U.S. Pat. No. 7,852,193), all of which are incorporated by reference in this application in their entirety.

FIELD OF THE INVENTION

This invention relates generally to test systems and more particularly to systems for testing push-button components.

BACKGROUND

A push-button is a type of electrical component that has long been used in user interfaces of electronic equipment. Push-buttons allow a user to change a state of an electronic system using a mechanical to electrical transducer. When pushed, the transducer generates an electrical signal to effect a change in the desired state. As an example, the push-button is commonly used to change an electronic device from a power-OFF to a power-ON state, and vice-versa. Push-buttons have found application in many specific functions besides changing the power-ON/OFF state of an electronic device. Typically, the push-button function specifies that the push-button be operable using a typical finger-push force, and be durable enough to operate after many such pushes at the typical finger-push force.

Push-buttons are also generally produced in high-volume and in many different configurations. For example, a keyboard is one configuration of a number of push-buttons, which may be produced in high volumes. Other examples include control panels for equipment such as audio equipment, test instruments, or any other device that may employ push-buttons in arrays or in layouts. There are a variety of configurations and a high-volume of use for many configurations. As a result, testing for operability and durability can be difficult and expensive. Typical test systems for push-buttons use force and displacement sensors, which by themselves tend to be expensive. In some push-button test systems, a xyz-gantry is used to position a force-displacement sensor over an array of buttons. The sensor in the xyz-gantry is connected to a data-logging device. The xyz-gantry then moves and pushes the sensor on each push-button in the array using a known force. As each push-button is tested, the data-logging device captures the data indicating operability of the push-button.

In another system, an array of force-displacement sensors is mounted on a plate. The plate is then pushed onto an array of push-buttons using a known force. Each sensor on the plate is connected to a data-logging device, which captures the data indicative of the push-button operability. Durability may be tested by repeating the test according to life test standards.

One problem with the xyz-gantry test system is that push-buttons are tested serially by a single force-displacement sensor. One problem with the force-displacement array plate is the expense in using multiple force-displacement sensors. Not only are the force-displacement sensors expensive, they typically require deployment of associated control and support modules to interface with the data-logging equipment, which add to the expense.

According, a need exists for a low-cost and reliable system for testing the operability of push-buttons.

SUMMARY

A system for testing a push-button switch is provided. The system for testing a push-button switch includes a switch test device. The switch test device has a flexible tab attached to a pushing member at an end of the flexible tab. A sensor is attached to the flexible tab. The sensor generates a signal that changes relative to a deformation of the flexible tab. A data collection system is connected to the switch test device and receives signals from the sensor.

A system for testing a plurality of push-button switches is also provided. The system for testing a plurality of push-button switches includes plurality of flexible tabs. Each flexible tab is attached to a respective pushing member at an end of each flexible tab. A sensor is attached to each flexible tab. The sensor generates a signal that changes relative to a deformation of the flexible tab. A force generating mechanism is used to impose a force on the on the flexible tabs. A data collection system is connected to the sensors and receives signals from the sensors as the force is imposed on the flexible tabs.

In another implementation, a method for testing a push-button test switch is provided. The testing method includes imposing a force on a flexible tab in a first direction. The flexible tab has a sensor attached that generates a signal. The flexible tab is attached to a pushing member to transfer the force to a push-button switch. The testing method also includes reversing the force to move in a second direction away from the tab. The signal from the sensor is sampled while the force is transferred to the push-button switch and while the force moves away from the push-button switch. The sample signals are analyzed as a function of time to detect an engagement or disengagement of the push-button switch.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 3 is a graph depicting an example of data readings that may be taken by a data collecting device connected to the device of FIG. 1 during operations described with reference to FIGS. 2A-2C.

FIG. 4 is a side perspective view of another example of an implementation of a system for testing a push-button.

FIG. 5A is a perspective view of an example of a test frame having flexible tabs for test devices to test a multi-push-button device.

FIG. 5B is a top view of the test frame in FIG. 5A.

DETAILED DESCRIPTION

In the following description, reference is made to the accompanying drawings that form a part of this application, and which show, by way of illustration, specific implementations in which the invention may be practiced. Other implementations may be utilized and structural changes may be made without departing from the scope of the invention.

Figure 1:
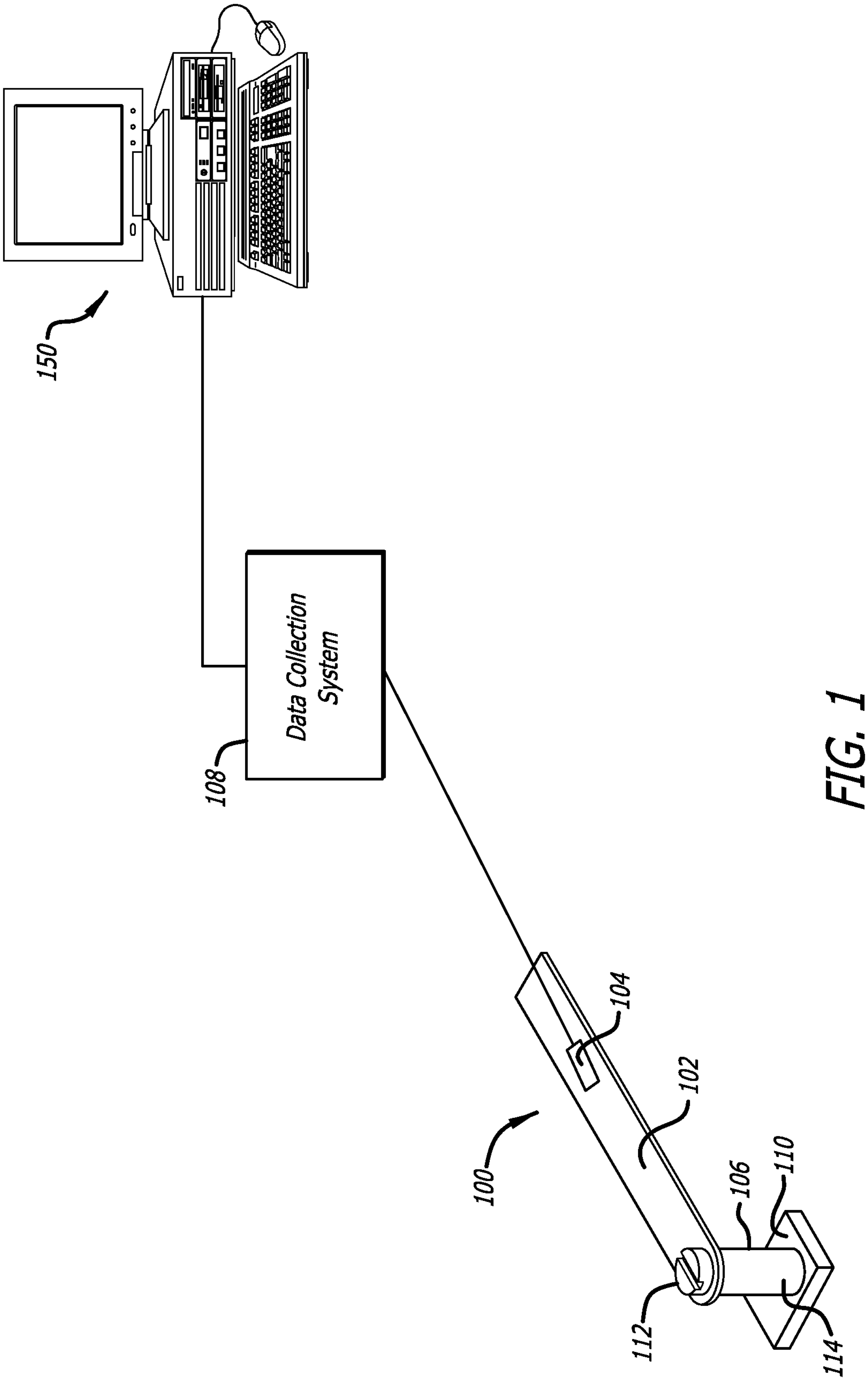
FIG. 1 is a perspective and partially schematic view of one example of a system for testing a push-button.

FIG. 1 shows a perspective and partially schematic view of an example of a switch test device 100 for testing a push-button switch 110. The test device 100 includes a flexible tab 102 fixedly attached to a pushing member 106 substantially at an end of the flexible tab 102. The flexible tab 102 includes a deformation sensitive resistor 104 attached to its surface. The deformation sensitive resistor 104 may be connected electrically to a data collection system 108. The switch test device 100 may be supported by attachment of the flexible tab 102 to a support (not shown in FIG. 1). The attachment of the flexible tab 102 to the support (not shown) is made at the end of the flexible tab 102 that is opposite the end that is attached to the pushing member 106.

The test device 100 operates by impressing a known force on the flexible tab 102. The force is transferred to the switch 110, which may form all or part of a push-button, via the pushing member 106. The deformation sensitive resistor 104 senses the deformation of the flexible tab 102 as it flexes under the known force pushing on it. As the force presses on the flexible tab 102, the data collecting device 108 connected to the deformation sensitive resistor 104 senses a change in resistance in the deformation sensitive resistor indicative of the known force pressing on the tab. The switch 110 moves in the direction of the force and generates a reactionary force opposing the known force. The interaction of these opposing forces (i.e. known force v. reaction force) may be detected by the data collecting device 108 thereby providing signals indicative of engagement and disengagement of the switch 110.

The structure of the test device 100 in FIG. 1 is simple. The flexible tab 102 may be made of any material that is sufficiently flexible to bend under the forces applied during testing, yet sufficiently rigid to prevent flexing in the absence of applied forces. In one example, the flexible tab 102 is made of a spring quality sheet metal (e.g. steel). The dimensions of the flexible tab 102 may depend on achieving a suitable flexibility as well as on possible size restrictions on the flexible tab 102. As described below with reference to FIGS. 5-7, multiple test devices 100 may be included in a test system to test multiple switches simultaneously. The dimensions may also be dependent upon on the size of the switch 110 being tested and the forces that may be used to test the switch 110.

The pushing member 106 may be any stiff, substantially inflexible rod with an attaching mechanism on one end and a pushing end 114 opposite the end having the attaching mechanism. In FIG. 1, the pushing member 106 includes threading for a screw 112 as an attaching mechanism. The screw 112 may be fitted through a hole in the flexible tab 102 and attached through the threading in the member 106. Those of ordinary skill in the art will appreciate that other types of attaching mechanisms may be used as well, including without limitation adhesives, rivets and other types of fasteners. The pushing end 114 of the pushing member 106 opposite the end having the attaching mechanism may remain unattached. During operation, the pushing end 114 applies the known force to the switch under test 110.

The deformation sensitive resistor 104 in the example device 100 in FIG. 1 is attached to a surface of the flexible tab 102. On the surface of the flexible tab 102, the deformation sensitive resistor 104 may sense the deformation and stress of the flexible tab 102 as the flexible tab 102 flexes from being subject to the known force. The deformation sensitive resistor 104 may be a strain gage, or any other type of sensor that changes in electrical resistance as a force or planar stress is applied to it. In one example, the deformation sensitive resistor 104 includes uni-axial or multi-axial configurations. Uni-axial resistors are sensitive to flexing along one dimension, such as the length of the deformation sensitive resistor 104. Multi-axial deformation sensitive resistors 104 may include two or more uni-axial resistors stacked, distributed in a circle to measure deformation on different axes, or otherwise arranged to sense resistances in along the length, width and/or depth of the deformation sensitive resistor 104. The deformation sensitive resistor 104 changes electrical resistance as it is stressed thus providing a substantially linear signal response to the applied known force. The deformation sensitive resistor 104 may be connected to a signal amplifier, which may be part of, or connected to, the data collecting system 108.

The data collecting system 108 may process the linearly changing signal response from the deformation sensitive resistor 104 in a variety of ways. In one example, a current is applied to the deformation sensitive resistor 104 to obtain a base signal level indicative of a zero force applied to the flexible tab 102. As the force is applied to the flexible tab 102, the deformation sensitive resistor 104 changes resistance, which results in a changing voltage drop across the deformation sensitive resistor 104. The changing voltage drop changes the signal level received by the data collecting device 108 and as the signal changes, the data collecting device may track the change in signal level as a function of time. When the known force on the flexible tab 102 pushes the tab 102 sufficiently to cause a reaction force at the pushing member 106 to push the switch under test 110 to the point of engagement, the flexible tab 102 reacts to the force generated by the switch 110 upon engagement. The reaction by the flexible tab 102 is sensed by the deformation sensitive resistor 104, which generates a change in the signal received by the data collection device 108. At a time after the point of engagement, the known force reverses direction and at a point during the reverse direction of the force, the flexible tab 102 reacts to the disengagement of the switch 110. The deformation sensitive resistor 104 senses the disengagement of the switch 110, which is reflected in the signal communicated to the data collecting system 108.

A computer system 150 may be connected to the data collection system 108 to provide data processing resources. Those of ordinary skill in the art will appreciate that the computer system 150 may communicate with the data collection system 108 using any suitable computer communications connection scheme. In addition, the data collection system 108 may be integrated with the computer system 150; for example, the data collection system 108 may be implemented in a card, or printed circuit, that connects to the internal bus system in the computer system 150.

Figure 2A:
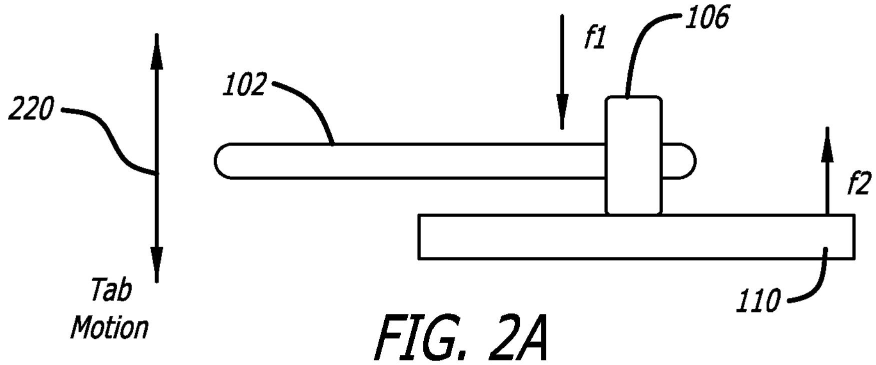
FIG. 2A is a side view of the device of FIG. 1 in a schematic illustration of a first phase of operation of the system of FIG. 1.
Figure 2B:
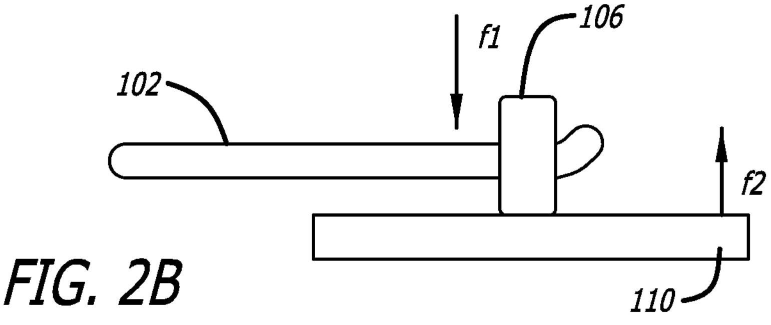
FIG. 2B is a side view of the device of FIG. 1 in a schematic illustration of a second phase of operation of the system of FIG. 1.
Figure 2C:
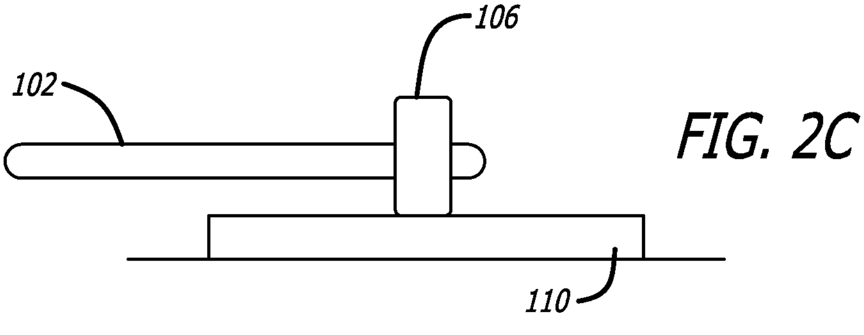
FIG. 2C is a side view of the device of FIG. 1 in a schematic illustration of a third phase of operation of the system of FIG. 1.

FIGS. 2A-2C are side view representations of the switch test device 100 illustrating operation of the switch test device 100 during a test measurement. As shown in FIG. 2A, force f1 is a known or applied test force that is imposed on the flexible tab 102 in the downward direction as shown in FIG. 2A. The force, f1, on the flexible tab 102 is transferred to the connected pushing member 106 in the same direction. The pushing member 106 pushes on the switch under test 110, and the switch 110 reacts by generating a reaction force f2 in the opposite direction (upward). The force f1 causes the flexible tab 102 to move in the downward direction when the force is applied in the downward direction (at 220). The flexible tab 102 also moves upward when the direction of the force f1 is changed to go upwards (at 220). As the flexible tab 102 moves, it bends, which causes a change in resistance in the deformation sensitive resistor 104 that may be substantially proportional to the amount force imposed on flexible the tab 102.

FIG. 2B shows the device 100 with the flexible tab 102 substantially fully flexed to a point where the force f1 can no longer displace any portion of the flexible tab 102. The switch 110 has also reached its limit of motion. The direction of the force f1 may be reversed to push in the upward direction. The flexible tab 102 moves up with the force as a result of its flexibility. The deformation sensitive resistor 104 senses the flexing of the flexible tab 102 as the force f1 switches directions and generates a change in signal to the data collection system 108.

FIG. 2C shows the side view of the device 100 with the flexible tab 102 back to its normal position with no forces applied. The data collection system 108 may track the signal at the deformation sensitive resistor 104 as the force f1 moves in the upward direction until the flexible tab 102 is at is original position. As the flexible tab 102 moves upward, the point of disengagement may be sensed by the data collection device 108.

FIG. 3 is a graph illustrating a set of data collected by the data collection system 108 during one measurement taken by a test device such as the test device 100 in FIG. 1. The vertical axis of the graph in FIG. 3 may represent travel distance, or displacement of the flexible tab 102 in the direction of the force f1. The horizontal axis of the graph in FIG. 3 represents time. A test is conducted on a push-button switch by placing a switch test device (such as the device 100 in FIG. 1) over the push-button switch under test so that the push end of the pushing member 106 touches the switch. A known force is then imposed on the flexible tab 102 as described with reference to FIGS. 2A-2C. As the known force moves in the first direction and then in the second direction, the data collection system 108 samples the signal level at the deformation sensitive resistor 104. For example, the voltage level across the deformation resistor 104 may be measured periodically at a sampling rate. The graph in FIG. 3 is an example of data generated during a test of a switch.

Referring to FIG. 3, at the point labeled ‘0’ on the vertical axis, the force f1 begins to move the tab 102 in a downward direction. Over time, the motion down is reflected on the graph as a downward slope at 302. When the switch engages, the reaction force f2 causes a change in the signal reflected as a “blip” at 310. The force f1 dominates the force f2 and continues to move the tab downward as shown at slope 312. At a point 314, the direction of force f1 may be reversed to the UP direction. The change in direction causes a change in the signal so that the curve slopes upward at 316. When the switch disengages, another “blip” is sensed by the data collection device 108 and recorded in the graph at 318. The force f1 continues upward at 320 until the tab 102 returns to its original position as reflected at 322 of the graph.

The test device 100 of FIG. 1 may be used to generate graphs such as that of FIG. 3 for each switch tested. The graph in FIG. 3 advantageously allows for quick visual analysis of either success or failure of the push-button. If the graph includes the points of engagement and disengagement (at 310 and 318, respectively in FIG. 3), the push-button may be deemed operable. If either point is missing from the graph, the switch under test may be deemed to have failed the test. For switches having a spring-release mechanism, the lower portions of the curve in FIGS. 3 (at 312, 314, and 316, respectively) may be further analyzed for more detailed information about operation of the switch. Those of ordinary skill in the art will appreciate that the analysis of the data may be automated using software that scans, or curve-fits the data, to match a pattern for a model that is deemed operable.

FIG. 4 shows another example of one embodiment of a switch test device 400 for testing a push-button switch. The switch test device 400 includes a flexible tab 402, a pushing member 406, and a screw 412 for attaching the flexible tab 402 to the pushing member 406. The pushing member 406 includes a lower member portion 416 having a wheel 420 attached via an axle 422 at its lower end. The wheel 420 provides a test device contact surface that transfers the known force to the test device in only one direction-the downward direction. The wheel 420 cancels out the effect that a sideways force may have on the test device by allowing freedom of movement in the sideways direction.

FIGS. 1-4 describe examples, and illustrate operation of a switch test device for testing a single push-button switch. Multiple test devices may be arranged in a manner that would permit testing of multiple switches. Such an arrangement may be made to mirror a configuration of switches having a predetermined layout, such as a keyboard, or a user interface for electronic components.

FIG. 5A is a perspective view of an example of a test frame 500 having a plurality of flexible tabs 502 arranged in a layout that mirrors an array of push-buttons. The test frame 500 may be made of stainless steel and be sufficiently thin to be flexible. Each flexible tab 502 may be cut out from the test frame 500 and left supported in the test frame by leaving one end of the flexible tab 502 uncut at 520, for example. On the other end of the flexible tab 502, a hole (as illustrated as 606 of FIG. 6) permits attachment of a pushing member 506 (106 in FIG. 1). The pushing member is attached using an attaching mechanism 512.

FIG. 5B is a top view of the test frame 500 of FIG. 5A. The test frame 500 may be supported against a sample configuration to be tested. The pushing members 106 (FIG. 1) extend downward towards the push-button under test corresponding to the flexible tab on the test frame 500.

Figure 6:
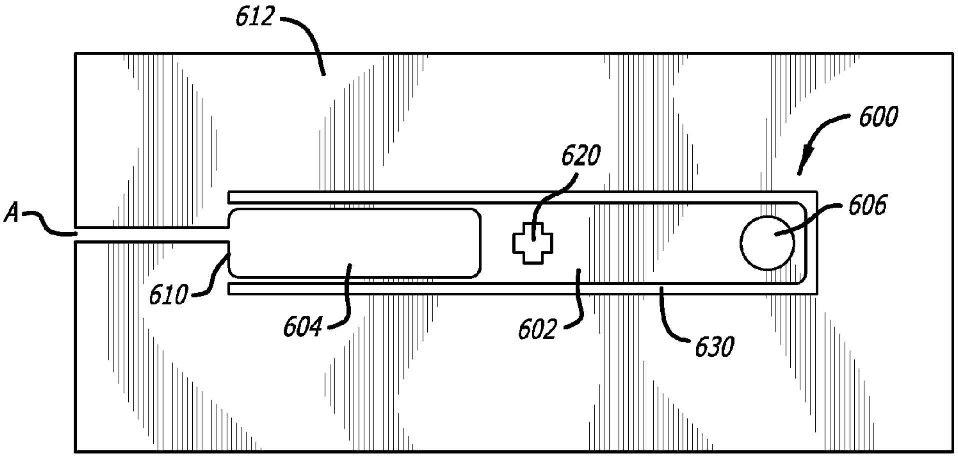
FIG. 6 is a top view of the test frame in FIG. 5B at Detail A.

FIG. 6 is an overhead view of the flexible tab cutout 600 in Detail A of FIG. 5B. The flexible tab cutout 600 includes the flexible tab 602, which has a pushing member attachment hole 606 on one end, and a fixed end 610 on the opposite end. A deformation sensitive resistor 604 is mounted on the surface of the flexible tab 602. The flexible tab 602 may also include a force receiving region, illustrated by test point mark 620 in FIG. 6, indicating a point of contact for a force-generating mechanism. In operation, the force-generating mechanism, which may be a protrusion on another frame, is positioned near the test point mark 620 and pressed to the flexible tab 602 by the known force (e.g. described above with reference to FIGS. 2A-2C). The flexible tab 602 holds a pushing member such as that described with reference to FIG. 1 at the pushing member attachment hole 606.

The test frame 500 in FIG. 5 may be constructed by using a sheet of flexible material such as stainless steel, and cutting the pattern through the sheet using a die. The flexible tab cutout 600 in FIG. 6 shows a flexible sheet 612 with a cut 630 surrounding the flexible tab 602 leaving the fixed end 610 to support the tab in the sheet 612. Those of ordinary skill in the art will appreciate that any suitable cutting tool may be used for the cut 630 and the pushing member attachment hole 606. The deformation sensitive resistor 604 may be attached to the surface of the flexible tab 602 using a contact adhesive, welding (e.g. ultrasonic), or any suitable means for attachment.

Figure 7:
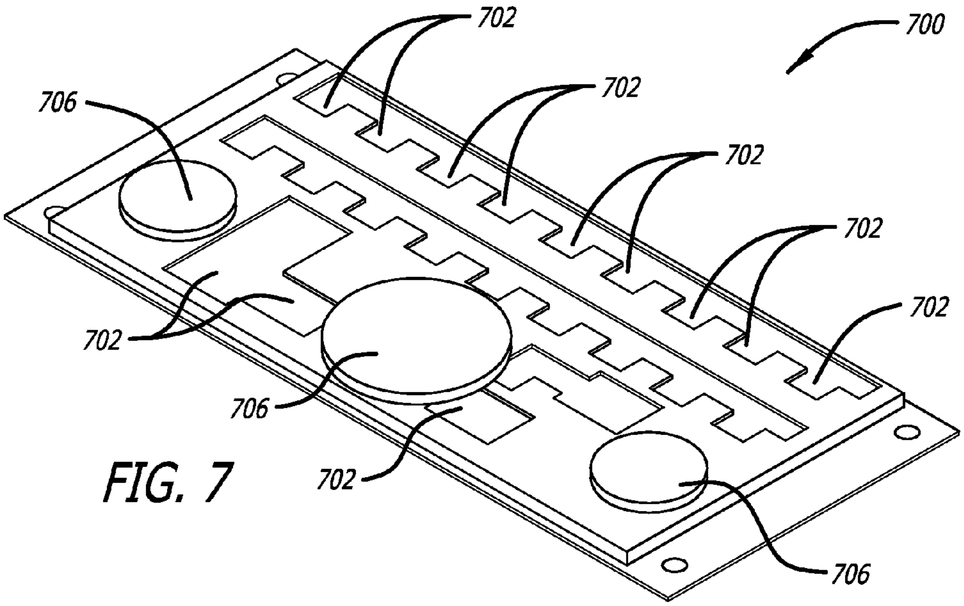
FIG. 7 is a perspective view of a test specimen that may be tested using an example of a system for testing push-buttons consistent with the present invention.

The test frame 500 in FIGS. 5A and 5B may be provided with pushing members and placed in a test fixture between a test specimen 700 (FIG. 7) and a force-generating mechanism. The layout of the flexible tabs 502 in the test frame 500 advantageously mirrors all or some of the layout of switches that are to be tested on the test specimen. For example, FIG. 7 shows an example of a test specimen 700 having a plurality of push-button switches 702 that may be tested using example systems and devices consistent with the present invention. The test frame 600 (FIG. 6) may be cut to have a layout of flexible tabs 602 that mirrors the layout of the push-button switches 702 in the test specimen 700 such that the pushing members are aligned with each push-button switch 702 to be tested. The force generating mechanism may then impose the known force on each flexible tab 502 simultaneously, which transfer the force through the pushing members 106 (FIG. 1) onto the underlying push-button switches 702 on the test specimen 700. The force generating mechanism may be made to have a layout of protruding "pushers" or members extending to selectively push on a corresponding flexible tab 502.

The test specimen 700 in FIG. 7 may be tested in stages if, for example, the density of switches on the test specimen is too great to cut suitable flexible tabs in a corresponding test frame. A test frame, such as the test frame 600 in FIG. 6, may be cut in one pattern for one set of switches on the test specimen 700. Another test frame may have a different pattern to test another set of switches. The test frame 600 may also include holes that would permit larger structure on the test specimen 700 to slip through during the testing to eliminate interference from structure such as knobs 706 on the test specimen.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

The invention claimed is:

1. A system for testing a push-button switch comprising:

a switch test device having a flexible tab attached to a pushing member at an end of the flexible tab, wherein the flexible tab is formed by a flexible tab cutout in a sheet of flexible material;

a sensor attached to the flexible tab, the sensor being operable to generate a signal that changes relative to a deformation of the flexible tab; and a data collection system connected to the switch test device to receive signals from the sensor.

2. The system of claim 1 wherein the sensor is a deformation sensitive resistor.

3. The system of claim 2 wherein the deformation sensitive resistor comprises a strain gage.

4. The system of claim 3 wherein the strain gage comprises at least one of a uni-axial strain gage and a multi-axial strain gage.

5. The system of claim 1 wherein a current is applied to the sensor for obtaining a base signal, the base signal indicates a zero force applied to the flexible tab.

6. The system of claim 1 further comprising:

a signal amplifier coupled to the sensor for amplifying the signal from the sensor; and a data processor for analyzing the signals received from the sensor to detect an indication of an engagement or disengagement of a push-button switch under test.

7. A system for testing a plurality of push-button switches comprising:

a plurality of flexible tabs, each flexible tab attached to a respective pushing member at an end of each flexible tab, wherein each flexible tab is formed by a flexible tab cutout in a sheet of flexible material;

a sensor attached to each flexible tab, the sensors being operable to generate a signal that changes relative to a deformation of the flexible tab;

a force generating mechanism operable to impose a force on the flexible tabs; and a data collection system connected to the sensors to receive signals from the sensors as the force is imposed on the flexible tabs.

8. The system of claim 7 wherein a first end of each flexible tab is attached to the sheet and a second end opposite the first end is not attached to the sheet and wherein the second end is attached to a pushing member.

9. The system of claim 8 wherein the flexible tabs are arranged in a layout that mirrors a layout of a test specimen.

10. The system of claim 9 wherein:

the pushing member attached to each flexible tab is aligned with a corresponding push-button switch of the test specimen;

the sheet is positioned in a frame between the force generating mechanism and the test specimen; and the force generating mechanism is a protrusion on a frame, the protrusion is positioned proximate to a force receiving region of the tab.

11. The system of claim 7 wherein the sensor is a deformation sensitive resistor.

12. The system of claim 11 wherein the deformation sensitive resistor comprises a strain gage.

13. The system of claim 12 wherein the strain gage comprises at least one of a uni-axial strain gage and a multi-axial strain gage.

14. The system of claim 7 wherein a current is applied to the sensor for obtaining a base signal, the base signal indicates a zero force applied to the flexible tab.

15. The system of claim 7 further comprising:

a signal amplifier coupled to the sensor for amplifying the signal from the sensor; and a data processor for analyzing the signals received from the sensor to detect an indication of an engagement or disengagement of a push-button switch under test.

16. A method for testing push-button switches comprising:

imposing a force on a flexible tab in a first direction, the flexible tab having sensor attached to generate a signal, the flexible tab attached to a pushing member to transfer the force to a push-button switch and, wherein the flexible tab is formed by a flexible tab cutout in a sheet of flexible material;

reversing the force to move in a second direction away from the flexible tab;

sampling the signal from the sensor while the force is transferred to the push-button switch and while the force moves away from the flexible tab; and analyzing the sample signal as a function of time to detect an engagement or disengagement of the push-button switch.

17. The method of claim 16 further comprising amplifying the signal from the sensor with a signal amplifier.

18. The method of claim 16 further comprising applying a current to the sensor to obtain a base signal, the base signal indicates a zero force applied to the flexible tab.

19. The method of claim 16 further comprising generating a graph based on the sample signal to visually illustrate a change in the sample signal as the force is imposed on and reversed from the flexible tab.

* * * * *